UNITED STATES PATENT OFFICE.

VICTOR LENDECKE, OF LUDWIGSHAFEN, GERMANY, ASSIGNOR TO THE BADISCHE ANILIN & SODA FABRIK, OF SAME PLACE.

PROCESS OF MORDANTING.

SPECIFICATION forming part of Letters Patent No. 671,894, dated April 9, 1901.

Application filed March 29, 1899. Serial No. 711,027. (No specimens.)

*To all whom it may concern:*

Be it known that I, VICTOR LENDECKE, a subject of the Emperor of Austria-Hungary, residing at Ludwigshafen-on-the-Rhine, in the Kingdom of Bavaria and Empire of Germany, have invented new and useful Improvements in Mordanting Fibers, (for which applications for foreign patents have been filed as follows: in Germany, No. B 23,530, dated October 10, 1898; in England, No. 21,833, dated October 17, 1898, and in France, No. 271,354, dated November 28, 1898,) of which the following is a specification.

Under the name of "chrome bisulfite" a product prepared by dissolving freshly-precipitated chrome oxid in aqueous sulfurous acid containing some sulfuric acid is already used as a mordant. The present invention relates to an improved process for fixing chrome oxid on cotton and other vegetable fibers, making use of the said product.

Although chrome mordants have been largely used for many years on animal and vegetable fiber, still all the processes for fixing chrome oxid for use as a mordant on cotton and other vegetable fiber have suffered from some disadvantage or other. Some of the processes involved drying the material after treating with mordant solution and were consequently expensive. In some of them it was difficult to obtain even shades, so that although applicable to piece goods and other cases where it was possible to insure an even application of the mordanting solution still they were not applicable to cotton yarn, loose cotton, or the like. Again, when mordanting by some of the old processes for fixing chrome on the fiber the chrome oxid, although precipitated on the fiber, would not adhere to it, but was liable to be washed away when swilling the goods.

The present invention affords a cheap method of fixing chrome oxid on cotton or other vegetable fiber in such a way that uniform dyeings can be subsequently obtained even on cotton or other vegetable yarns and loose cotton or other vegetable fibers. It can also be applied to piece goods with advantage.

The main feature of the process consists in impregnating the material to be mordanted with a comparatively dilute solution of chrome bisulfite and subsequently treating the goods without previous drying with an "alkaline" salt, by which term I mean a salt which is alkaline to litmus—such, for instance, as carbonate or bicarbonate of soda, carbonate of potash, phosphate of soda, or the like—when the fixing of the chrome on the fiber takes place quite evenly.

The following example will serve to illustrate the manner in which my invention can best be carried into practical effect: Take about one hundred kilograms of cotton yarn, which have been previously thoroughly boiled and wrung out in a centrifugal machine, and steep them for several hours, preferably over night, in a chrome-bisulfite solution of 10° Baumé, wring out the goods thoroughly, and free them from excess of chrome-bisulfite solution by treating them in a centrifugal machine. Then without drying pass them for about ten to fifteen minutes through a bath containing about three grams of calcined soda for every liter of water and which is maintained at a temperature of 60° centigrade. Wash the goods, treat them once more in the centrifugal machine, and then steep them in a solution which contains about one hundred grams Turkey-red oil for every liter of water and then dry.

The unabsorbed chrome-bisulfite solution can be used repeatedly, only sufficient fresh concentrated solution must be added after each operation to bring it to the desired strength. Goods mordanted with a chrome-bisulfite solution of the aforesaid strength yield dark shades when dyed. For medium shades the mordanting-bath need only be of 5° Baumé and for light shades of 3° Baumé. The quantity of soda in the fixing-bath can also be diminished in a corresponding manner. The process, as illustrated by the above example, can be applied to loose cotton and to cotton piece goods and also to linen and hemp. Instead of soda other salts which act as alkalies, such as those aforementioned, can be used.

Now what I claim is—

The process of mordanting vegetable fiber by means of an aqueous solution of chromium bisulfite, which consists in impregnating the goods to be dyed with this solution and passing the goods in the wet condition through a bath containing a hereinbefore-defined alkaline salt, substantially as described.

In testimony whereof I have hereunto set my hand in the presence of two subscribing witnesses.

VICTOR LENDECKE.

Witnesses:
GUSTAV L. LUTTENBERGER,
ADOLPH REUTTINGER.